April 24, 1951     E. GASSMAN     2,550,239
ATTACHED RAISING JACK FOR MOTOR VEHICLES
Filed Feb. 12, 1948     2 Sheets-Sheet 1
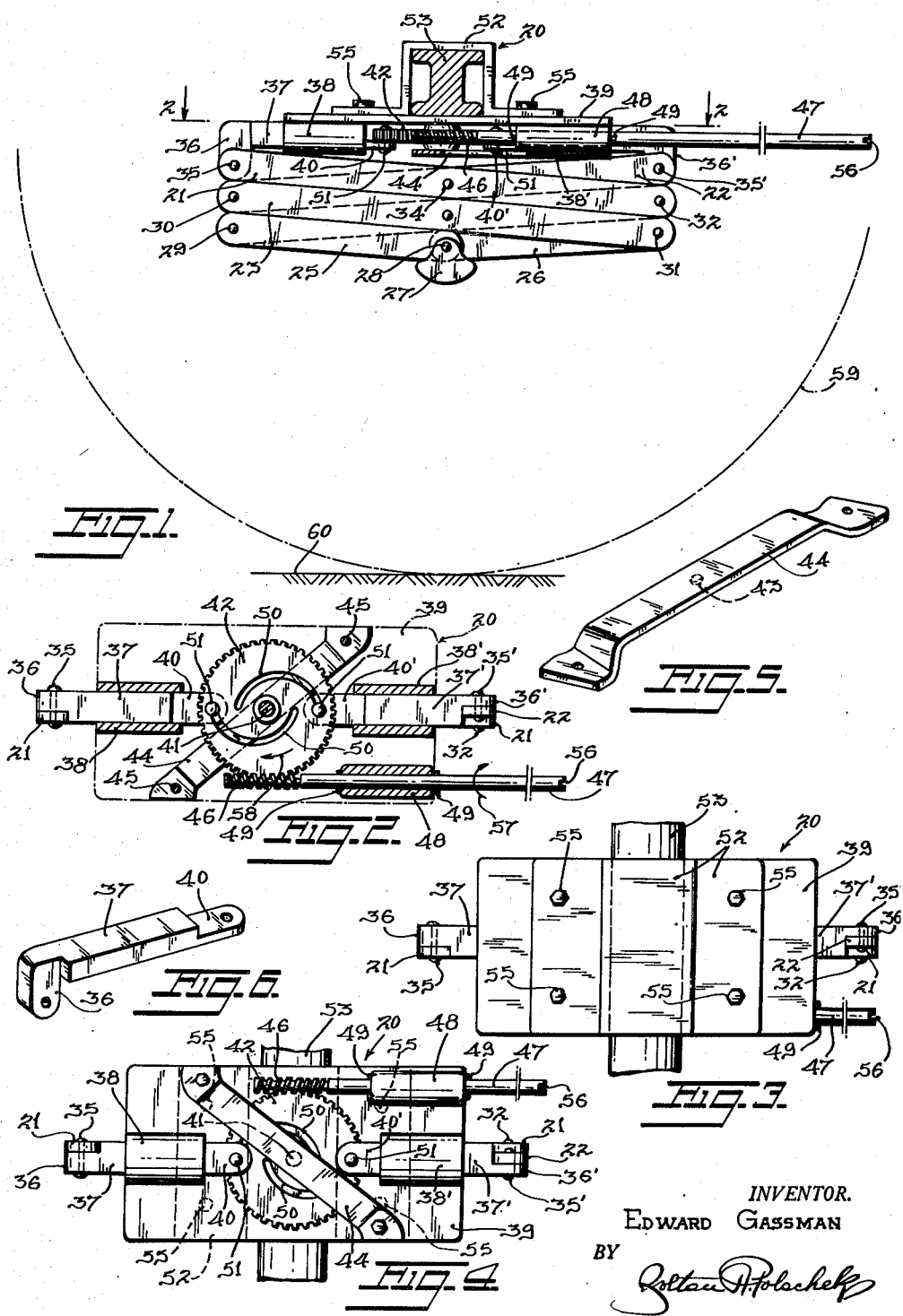
INVENTOR.
EDWARD GASSMAN
BY
ATTORNEY April 24, 1951 E. GASSMAN 2,550,239
ATTACHED RAISING JACK FOR MOTOR VEHICLES
Filed Feb. 12, 1948 2 Sheets-Sheet 2
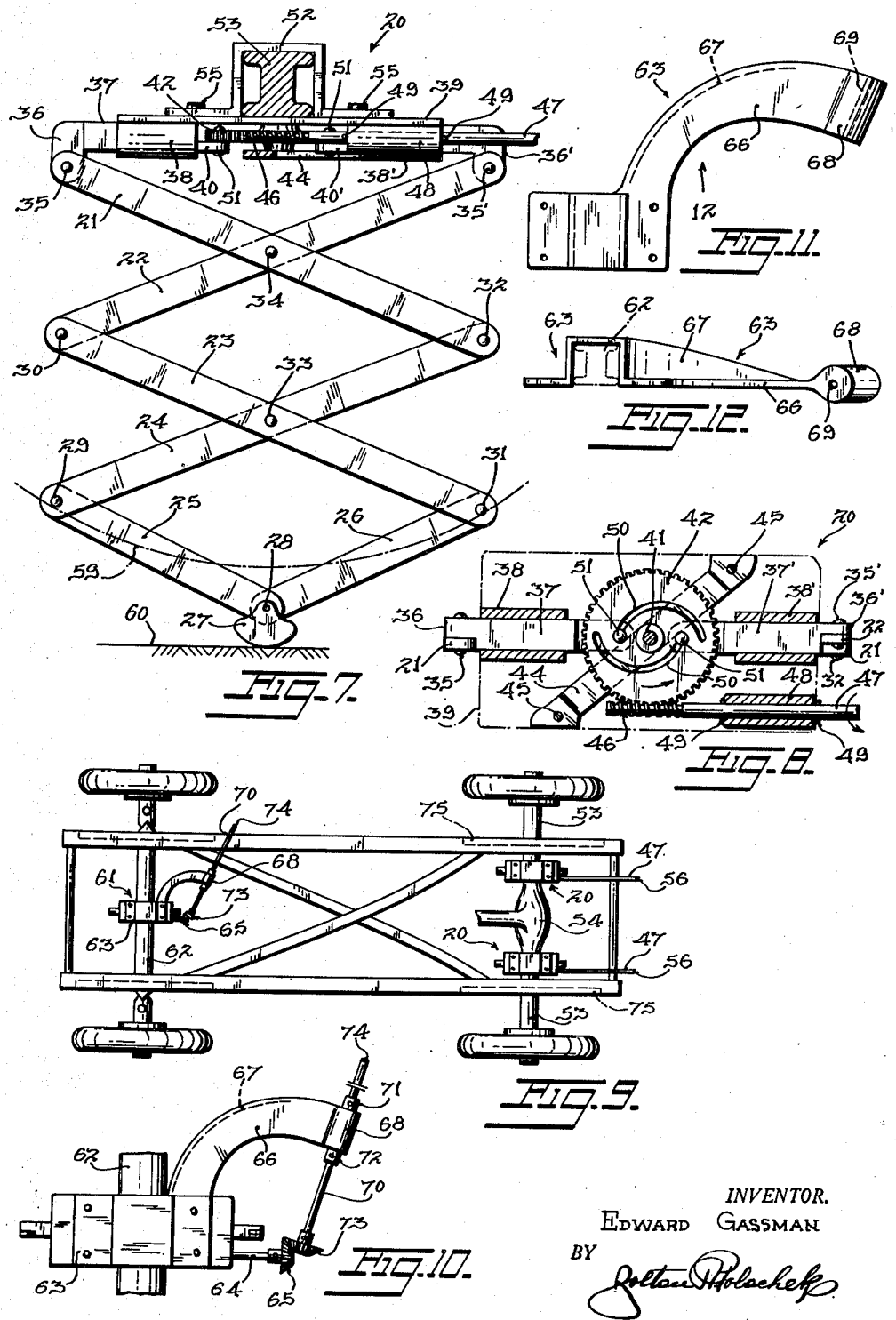
INVENTOR.
EDWARD GASSMAN Patented Apr. 24, 1951

2,550,239

UNITED STATES PATENT OFFICE 2,550,239

ATTACHED RAISING JACK FOR MOTOR VEHICLES

Edward Gassman, New York, N. Y.

Application February 12, 1948, Serial No. 7,827

2 Claims. (Cl. 254—86)

This invention relates to new and useful improvements in raising jacks for motor vehicles, and, more particularly, aims to provide a novel and valuable jack—including permanent installation for an automobile.

As the invention is preferably carried out, the installation is a jack—including one, with a pair of the new jacks provided for the rear axle, and a single new jack provided for the front axle. These jacks can be mounted on their appropriate axles, or elsewhere on the chassis of the vehicle; but as herein shown they are illustrated as inclusive of means for readily mounting them on the axles.

Essentially, a jack according to the invention includes a lazy-tongs component, whereby normally such tongs may be collapsed up high enough above the road not ever to engage the ground, but whereby on applying a thrust in substantially a horizontal direction said component may be expanded vertically downward thereby to lift the vehicle or a selected portion thereof off the ground, as for tire changing or the like. According to the arrangement shown herein, with a jack on one end portion of the rear axle, another jack on the other end portion of said axle, and a jack on the front axle, one such jack is operated to raise one rear wheel, another such jack is operated to raise the other rear wheel, and the third jack is operated to raise both front wheels.

An important object of the invention is to provide such a relatively inexpensive, rugged, dependably functioning yet conveniently and easily operated jack, whatever its location, that various desiderata heretofore sought will for the first time be obtained. Thus, the new jack is exceedingly compact when retracted in normally collapsed condition, and yet is of unusually powerful lifting efficacy when operated to elevate a selected portion of the vehicle. Also, the new jack is free of such undesirable complexities and bulk-increasing expedients as a rotatable screw having a thread of great length, or a screw having over a portion of its length a thread of one hand and over another portion of its length a thread of the opposite hand, or trackways or guide means of great length, or other troublesome features.

Yet, with all its compactness, the new jack gives a double mechanical advantage, so that when, as will probably always be the case, hand power is used to expand and collapse the lazy-tongs component, the muscular effort required is very slight. This double mechanical advantage is obtained by employing a worm and worm-gear couple, and, in combination therewith, a cam and cam-follower couple.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Fig. 1 is an elevational view, showing an embodiment of the invention as now favored, in normal or collapsed condition; a portion of a wheel periphery being indicated in dot and dash.

Fig. 2 is a horizontal section, taken on the line 2—2 of Fig. 1.

Fig. 3 is a top plan view, looking down on the parts as seen in Fig. 1.

Fig. 4 is a bottom plan view thereof.

Fig. 5 is a perspective view of a casting seen in Fig. 2.

Fig. 6 is a similar view, showing that one of the two slide members which is shown at the left in Figs. 1 and 2.

Fig. 7 is a view similar to Fig. 1, but showing the jack expanded.

Fig. 8 is a view similar to Fig. 2, but showing the parts of Fig. 2 redisposed to expand the jack as in Fig. 7.

Fig. 9 is a more or less schematic top plan view of an automobile chassis and its running gear, with two of the jacks of Figs. 1–8 mounted on the rear axle, and with a similar jack, but one somewhat modified, mounted on the front axle.

Fig. 10 is, on a scale enlarged over that of Fig. 9, a top plan view of the last named jack.

Fig. 11 is a similar view, but showing, detached, the top casting of the jack of Fig. 10.

Fig. 12 is an elevational view of said casting, looking in the direction of the arrow 12 of Fig. 11.

Referring to the drawing more in detail, the jack illustrated, which as a whole is marked 20, includes, as best shown in Fig. 7, four lazy-tong links 21—24, and two bottom shorter links 25 and 26. The last-named two links are pivoted together and to a depending tread member 27 at 28; the links 24 and 25 are interpivoted at 29; the links 22 and 23 are interpivoted at 30; the links 23 and 26 are interpivoted at 31; and the links 21 and 24 are interpivoted at 32. The links 23 and 24 where they cross each other are interpivoted at 33, and the links 21 and 22 where they cross each other are interpivoted at 34.

The upper end of the link 21 is pivoted at 35 to an ear 36 vertically downwardly extended from a slide member 37, mainly of square cross-section as shown in Fig. 6, and endwisely slidable through a guideway formed interiorly of a boss 38 integral with and depending from a casting 39. The inner end of the slide member 37 has a horizontal ear 40 extended therefrom.

The upper end of the link 22 is pivoted at 35' to a slide member 37' almost exactly like the slide member 37 and similarly slidably mounted in the casting 39; so that, relative to the member 37', the parts 36', 38' and 40' correspond respectively to the parts 36, 38 and 40, except, as will be noted, that the ear 36' is thinner than the ear 36 for insuring proper lie of the links 21 and 22.

On a vertical shaft 41 is a worm-gear 42; and for supporting the lower end of this shaft, in a recess 43 (see Fig. 5), a bottom casting 44 is provided and secured to the underside of the casting 39 as indicated at 45. Meshing with this worm-gear is a worm 46 formed on the end of a shaft 47 journalled in a boss 48 formed integral with and depending from the casting 39; said shaft 47 having transverse pins 49 for preventing endwise movement thereof.

Worm-gear 42 acts as a duplex cam, having cam slots 50, 50. A cam follower for each of said slots is a stud 51; one of said studs being on the ear 40 of the slide member 37 and the other being on the ear 40' of the slide member 37'.

A casting 52, hat-shaped in cross-section, is provided for clamping the casting 39 and the parts carried thereby to the rear axle 53 of the vehicle. Referring for the moment to Fig. 9, two of the jacks 20 are shown as mounted on the side extensions of said axle beyond the differential casing 54 thereof; which axle extensions may be of I-beam type as indicated in Figs. 1 and 7. The casting 39 is locked in place on the axle 53 by coupling said casting to the casting 52 about such an axle extension, as indicated in Figs. 1 and 7, as by four polygonal-head screws 55.

The shaft 47 extends a suitable distance toward the back of the vehicle, and such shaft at its rear end has a clutch-coupling element 56 to be engaged by a brace or other crank-like turning tool when the jack is to be operated.

As will now be understood, on turning the shaft 47 of a jack 20 in the direction of the arrow 57 of Fig. 2, the wormgear 42 is turned in the direction of the arrow 58, whereby the parts of Fig. 2 become redisposed as in Fig. 8, with the result that the lazy-tongs components as in Fig. 1 (there well up within the bounds of the adjacent wheel 59 and so well above the road 60) becomes expanded as in Fig. 7, thus to lift the wheel 59 well above the road 60. Turning of the shaft 47 in the opposite direction, of course, restores the parts to the condition shown in Figs. 1 and 2.

Attention is directed to the relatively slight sliding movements required of the members 37 and 37' to raise a wheel to the extent indicated in Fig. 7, considerably more than required merely for tire changing.

Either the jack 20 shown at the upper part of Fig. 9 or the jack 20 shown at the lower part of Fig. 9 will be operated, according as it is desired to raise the right or left rear wheel.

The aforesaid third jack, that marked as a whole 61, is mounted on the front axle 62 at about the middle of the length of the latter. Referring, in connection with this variation 61 of a jack 20, to Figs. 9–12, and noting that in Fig. 12 the cross section of the axle 62 is indicated in dot and dash, it is explained that the jack 61 is exactly like a jack 20, except that a hat-shaped casting 63 is substituted for the hat-shaped casting 52, the shaft 64 corresponding to the shaft 47 is rather short, and said shaft 64 has fixed thereon a bevel gear 65.

Integral with the hat-shaped casting 63, in a manner clearly shown in Figs. 11 and 12, is a curvilinearly extended arm 66, strengthened by a vertical rib 67 and terminating in a boss 68 having a longitudinal bore 69 therethrough. Journalled in said bore is an auxiliary shaft 70, held against endwise movement by collars 71 and 72 fixed thereon, and fixedly carrying a bevel gear 73 meshing with the gear 65. The outer end of the shaft 70, beyond the field of swing of the adjacent forward wheel in steering the vehicle, is a clutch-coupling element 74 to be engaged by a brace or other crank-like turning tool when the jack 61 is to be operated.

By means of such tool, said shaft 70 may be readily turned in one direction or the other, in one case to expand the lazy-tongs component of the jack 61, thereby to lift both front wheels off the ground, and in the other case to collapse said component and so cause lowering of said wheels to the ground.

As will be understood, each jack 20, instead of being attached to the rear axle 53, may be attached to any convenient part of the vehicle; for instance, one such jack to each of the rear springs thereof, these indicated at 75 in Fig. 9. In such event, the hat-shaped casting 52, if used as part of the jack attaching means, will have its main channel, which in Fig. 1 is shown as extending along the length of the axle, extended along the length of the spring.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. An automobile jack comprising, a base element, means for supporting said base element from a vehicle axle, slide members slidably carried in end to end relationship by said base element, a lazy-tongs component supported by the oppositely disposed ends of said slide members, a tread member carried by the lower end of said lazy-tongs component, a cam and cam follower mechanism carried by said base element and having operable means supported by said base element and operably engaging said cam mechanism for simultaneously extending and contracting said slide members and said lazy-tongs component.

2. An automobile jack comprising, a base element, means for supporting said base element from a vehicle axle, slide members slidably carried in end to end relationship by said base element, a lazy-tongs component supported by the oppositely disposed ends of said slide members, a tread member carried by the lower end of said lazy-tongs component, a circumferentially geared wheel rotatably supported by said base element intermediate the adjacent ends of said slide members, a pair of oppositely disposed cam slots formed in diametrically opposed areas of said geared wheel, stud followers slidably retained in said cam slots, said studs each having a fixed connection with a different slide member adjacent the inner opposed ends thereof, an elongated shaft rotatably supported by said base element, a worm thread at one end of said shaft in operable engagement with said geared wheel, and a handle on the second end of said shaft for rotating said wheel and raising and lowering said lazy-tongs component.

EDWARD GASSMAN.

REFERENCES CITED

The following references are of record in the file of this patent:

UNITED STATES PATENTS

| Number | Name | Date |
|---|---|---|
| 1,188,153 | Condon | June 20, 1916 |
| 1,336,620 | Damker | Apr. 13, 1920 |
| 1,393,851 | Thorndike | Oct. 18, 1921 |

FOREIGN PATENTS

| Number | Country | Date |
|---|---|---|
| 186,992 | Switzerland | Jan. 2, 1937 |